United States Patent
Liu

(10) Patent No.: US 12,557,112 B2
(45) Date of Patent: Feb. 17, 2026

(54) PHYSICAL DOWNLINK CONTROL CHANNEL SENDING AND RECEIVING METHODS AND APPARATUSES

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 425 days.

(21) Appl. No.: 18/119,280

(22) Filed: Mar. 8, 2023

(65) Prior Publication Data

US 2023/0217455 A1 Jul. 6, 2023

Related U.S. Application Data

(63) Continuation of application No. PCT/CN2020/117210, filed on Sep. 23, 2020.

(51) Int. Cl.
*H04W 72/23* (2023.01)
*H04L 27/26* (2006.01)

(52) U.S. Cl.
CPC ......... *H04W 72/23* (2023.01); *H04L 27/2675* (2013.01)

(58) Field of Classification Search
CPC ..... H04W 72/23; H04W 72/12; H04W 72/04; H04W 72/14; H04W 76/27; H04W 76/20; H04W 74/08; H04W 88/08; H04W 48/12; H04L 27/26; H04L 5/00; H04L 25/02; H04L 25/03; H04L 1/00; H04L 1/08

USPC ........................................................ 370/329
See application file for complete search history.

(56) References Cited

U.S. PATENT DOCUMENTS

| | | | |
|---|---|---|---|
| 10,757,581 B2 * | 8/2020 | Hwang | H04L 5/0053 |
| 11,190,328 B2 * | 11/2021 | Gao | H04L 5/0051 |
| 11,206,655 B2 * | 12/2021 | Moon | H04L 1/1822 |
| 11,800,472 B2 * | 10/2023 | Sarkis | H04L 27/2613 |
| 11,895,510 B2 * | 2/2024 | Hwang | H04L 1/1861 |
| 11,997,675 B2 * | 5/2024 | Matsumura | H04W 72/1273 |
| 11,997,678 B2 * | 5/2024 | Kim | H04L 5/0053 |
| 12,089,208 B2 * | 9/2024 | Kim | H04L 5/001 |
| 12,171,007 B2 * | 12/2024 | Kim | H04W 72/23 |
| 2020/0119882 A1 | 4/2020 | Zhang et al. | |

(Continued)

FOREIGN PATENT DOCUMENTS

| CN | 103037514 A | 4/2013 |
|---|---|---|
| CN | 103259635 A | 8/2013 |

(Continued)

OTHER PUBLICATIONS

International Search Report Issued in Application No. PCT/CN2020/117210, dated May 26, 2021, with English translation, (4p).

(Continued)

*Primary Examiner* — Man U Phan
(74) *Attorney, Agent, or Firm* — Arch & Lake LLP

(57) ABSTRACT

The present disclosure relates to a physical downlink control channel (PDCCH) sending method. The method may be applicable to a base station that includes at least two transmitters. The method includes: sending PDCCHs to a terminal through a plurality of transmitters, where Demodulation Reference Signal (DMRS) sequences for the PDCCHs sent by the plurality of transmitters are different.

11 Claims, 8 Drawing Sheets

Receive PDCCHs sent by a plurality of transmitters in a base station through a plurality of receivers, where DMRS sequences for the PDCCHs sent by the plurality of transmitters are different — S901

Determine an initialization parameter corresponding to a PDCCH sent by each of the transmitters — S1001

Determine a DMRS sequence for the PDCCH sent by the transmitter according to the initialization parameter and a pseudo-random sequence — S1002

(56) References Cited

U.S. PATENT DOCUMENTS

| | | | |
|---|---|---|---|
| 2020/0229104 A1 | 7/2020 | MolavianJazi et al. | |
| 2020/0266946 A1 | 8/2020 | Kim et al. | |
| 2020/0367242 A1* | 11/2020 | Moon | H04L 5/0048 |
| 2022/0095367 A1* | 3/2022 | Kim | H04W 72/1273 |
| 2022/0158783 A1* | 5/2022 | Matsumura | H04L 5/0032 |
| 2025/0071776 A1* | 2/2025 | Kim | H04L 5/0053 |

FOREIGN PATENT DOCUMENTS

| | | |
|---|---|---|
| CN | 109804695 A | 5/2019 |
| CN | 110881220 A | 3/2020 |
| CN | 111130708 A | 5/2020 |
| CN | 111147206 A | 5/2020 |
| CN | 111147414 A | 5/2020 |
| WO | 2020073991 A1 | 4/2020 |
| WO | 2020144540 A1 | 6/2020 |

OTHER PUBLICATIONS

NTT DOCOMO, Inc, "Enhancements on multi-TRP/panel transmission", 3GPP TSG RAN WG1 #97, R1-1906224, Reno, USA, May 13-17, 2019, (32p).

MedaTek Inc., "Remaining issues on Dmrs", 3GPP TSG-RAN WG1 Meeting #92bis, R1-1804075, Sanya, China, Apr. 16-20, 2018, (3p).

* cited by examiner

```
┌─────────────────────────────────────────────────────────────┐
│ Send PDCCHs to a terminal through a plurality of transmitters, where │
│ demodulation reference signal (DMRS) sequences for the PDCCHs sent by │──S101
│         the plurality of transmitters are different          │
└─────────────────────────────────────────────────────────────┘
```

FIG. 1

```
┌─────────────────────────────────────────────────────────────┐
│     Determine an initialization parameter for each of the transmitters    │──S201
└─────────────────────────────────────────────────────────────┘
                                │
                                ▼
┌─────────────────────────────────────────────────────────────┐
│  Determine a DMRS sequence for the PDCCH sent by the transmitter │──S202
│  according to the initialization parameter and a pseudo-random sequence │
└─────────────────────────────────────────────────────────────┘
                                │
                                ▼
┌─────────────────────────────────────────────────────────────┐
│ Send PDCCHs to a terminal through a plurality of transmitters, where │
│ demodulation reference signal (DMRS) sequences for the PDCCHs sent by │──S101
│         the plurality of transmitters are different          │
└─────────────────────────────────────────────────────────────┘
```

FIG. 2

```
┌─────────────────────────────────────────────────────────────┐
│    Determine different scrambling IDs for the plurality of transmitters    │──S301
└─────────────────────────────────────────────────────────────┘
                                │
                                ▼
┌─────────────────────────────────────────────────────────────┐
│ Determine, for each transmitter, the initialization parameter for the pseudo- │
│  random sequence of the transmitter according to a corresponding  │──S302
│                        scrambling ID                         │
└─────────────────────────────────────────────────────────────┘
                                │
                                ▼
┌─────────────────────────────────────────────────────────────┐
│         Configure the scrambling IDs to the terminal         │──S303
└─────────────────────────────────────────────────────────────┘
```

FIG. 3

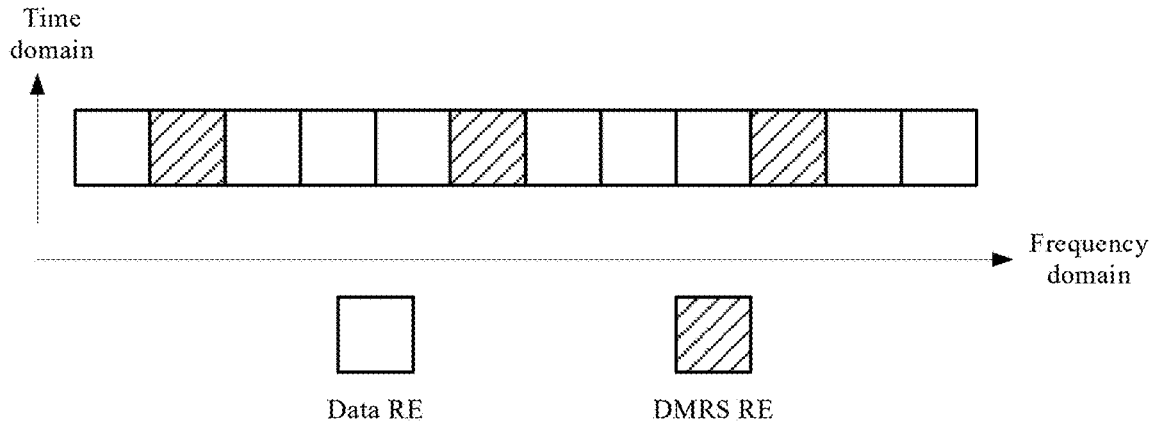

FIG. 8

```
┌─────────────────────────────────────────────────────┐
│ Receive PDCCHs sent by a plurality of transmitters  │
│ in a base station through a plurality of receivers, │─── S901
│ where DMRS sequences for the PDCCHs sent by the     │
│ plurality of transmitters are different             │
└─────────────────────────────────────────────────────┘
```

FIG. 9

```
┌─────────────────────────────────────────────────────┐
│ Receive PDCCHs sent by a plurality of transmitters  │
│ in a base station through a plurality of receivers, │─── S901
│ where DMRS sequences for the PDCCHs sent by the     │
│ plurality of transmitters are different             │
└─────────────────────────────────────────────────────┘
                         │
                         ▼
┌─────────────────────────────────────────────────────┐
│ Determine an initialization parameter corresponding │─── S1001
│ to a PDCCH sent by each of the transmitters         │
└─────────────────────────────────────────────────────┘
                         │
                         ▼
┌─────────────────────────────────────────────────────┐
│ Determine a DMRS sequence for the PDCCH sent by the │
│ transmitter according to the initialization         │─── S1002
│ parameter and a pseudo-random sequence              │
└─────────────────────────────────────────────────────┘
```

FIG. 10

Receive, by the plurality of receivers at a same time-frequency resource, the PDCCHs sent by the plurality of transmitters in the base station ~S1401

FIG. 14

Receive PDCCHs sent by a plurality of transmitters in the base station through a plurality of receivers, where DMRS sequences for the PDCCHs sent by the plurality of transmitters are different ~S901

Obtain DCI from at least one of the PDCCHs, where the DCI in each of the PDCCHs is identical ~S1501

FIG. 15

Receive PDCCHs sent by a plurality of transmitters in the base station through a plurality of receivers, where DMRS sequences for the PDCCHs sent by the plurality of transmitters are different ~S901

Obtain partial information of DCI from each of the PDCCHs ~S1601

Determine complete DCI according to partial information of the DCI obtained from the PDCCHs ~S1602

FIG. 16

PHYSICAL DOWNLINK CONTROL CHANNEL SENDING AND RECEIVING METHODS AND APPARATUSES

CROSS REFERENCE TO RELATED APPLICATIONS

The present application is a continuation of International Application No. PCT/CN2020/117210, filed on Sep. 23, 2020, the disclosure of which is incorporated herein by reference in its entirety for all purposes.

TECHNICAL FIELD

The present disclosure relates to the field of communication technology, in particular to Physical Downlink Control Channel (PDCCH) sending methods, PDCCH receiving methods, PDCCH sending apparatuses, PDCCH receiving apparatuses, electronic devices and computer-readable storage media.

BACKGROUND

A PDCCH can carry Downlink Control Information (DCI). DCI can function as allocating uplink and downlink resources, and reliability of the DCI can directly affect the performance of a communication system and user experience.

While, in related technologies, a base station sends a PDCCH to a terminal through one communication link during communication with the terminal. If the communication link is in shadow or deep fading, the reliability of PDCCH transmission cannot be ensured.

SUMMARY

In view of this, embodiments of the present disclosure provide a PDCCH sending method, a PDCCH receiving method, a PDCCH sending device, a PDCCH receiving device, an electronic device and a computer-readable storage medium, to solve the technical problem in the related technologies.

According to a first aspect of the embodiments of the present disclosure, a PDCCH sending method is provided. The method is applicable to a base station in which at least two transmitters are arranged and the method includes:

sending PDCCHs to a terminal through a plurality of transmitters, where Demodulation Reference Signal (DMRS) sequences for the PDCCHs sent by the plurality of transmitters are different.

According to a second aspect of the embodiments of the present disclosure, a PDCCH receiving method is provided. The method is applicable to a terminal in which at least two receivers are arranged and the method includes:

receiving PDCCHs sent by a plurality of transmitters in a base station through a plurality of receivers, where Demodulation Reference Signal (DMRS) sequences for the PDCCHs sent by the plurality of transmitters are different.

According to a third aspect of the embodiments of the present disclosure, a PDCCH sending apparatus is provided. The apparatus is applicable to a base station in which at least two transmitters are arranged and the apparatus includes:

a downlink sending unit, configured to send PDCCHs to a terminal through a plurality of transmitters, where Demodulation Reference Signal (DMRS) sequences for the PDCCHs sent by the plurality of transmitters are different.

According to a fourth aspect of the embodiments of the present disclosure, a PDCCH receiving apparatus is provided. The apparatus is applicable to a terminal in which at least two receivers are arranged and the apparatus includes:

a downlink receiving unit, configured to receive PDCCHs sent by a plurality of transmitters in a base station through a plurality of receivers, where Demodulation Reference Signal (DMRS) sequences for the PDCCHs sent by the plurality of transmitters are different.

According to a fifth aspect of the embodiments of the present disclosure, there is provided an electronic device including: a processor and a memory storing instructions executable by the processor. The processor is configured to perform the above-mentioned PDCCH sending method.

According to a sixth aspect of the embodiments of the present disclosure, there is provided a computer-readable storage medium, on which a computer program is stored, and when the program is executed by a processor, steps in the PDCCH sending method are implemented.

According to a seventh aspect of the embodiments of the present disclosure, there is provided an electronic device including: a processor and a memory storing instructions executable by the processor. The processor is configured to perform the above-mentioned PDCCH receiving method.

According to an eighth aspect of the embodiments of the present disclosure, there is provided a computer-readable storage medium, on which a computer program is stored, and when the program is executed by a processor, steps in the PDCCH receiving method are implemented.

BRIEF DESCRIPTION OF THE DRAWINGS

To illustrate technical solutions in the embodiments of the present disclosure, accompanying drawings to be referred in description of the embodiments will be briefly introduced below. Apparently, the accompanying drawings in the following description show some embodiments of the present disclosure. For those of ordinary skill in the art, other drawings can be obtained based on these drawings without creative endeavor.

FIG. 1 is a schematic flowchart of a PDCCH sending method according to an embodiment of the present disclosure;

FIG. 2 is a schematic flowchart of another PDCCH sending method according to an embodiment of the present disclosure;

FIG. 3 is a schematic flowchart of still another PDCCH sending method according to an embodiment of the present disclosure;

FIG. 8 is a schematic diagram showing a DMRS sequence mapped to time-frequency resources according to an embodiment of the present disclosure;

FIG. 9 is a schematic flowchart of a PDCCH receiving method according to an embodiment of the present disclosure;

FIG. 10 is a schematic flowchart of another PDCCH receiving method according to an embodiment of the present disclosure;

FIG. 14 is a schematic flowchart of still another PDCCH receiving method according to an embodiment of the present disclosure;

FIG. 15 is a schematic flowchart of still another PDCCH receiving method according to an embodiment of the present disclosure;

FIG. 16 is schematic flowchart of still another PDCCH receiving method according to an embodiment of the present disclosure;

DETAILED DESCRIPTION OF THE EMBODIMENTS

Figure 4:
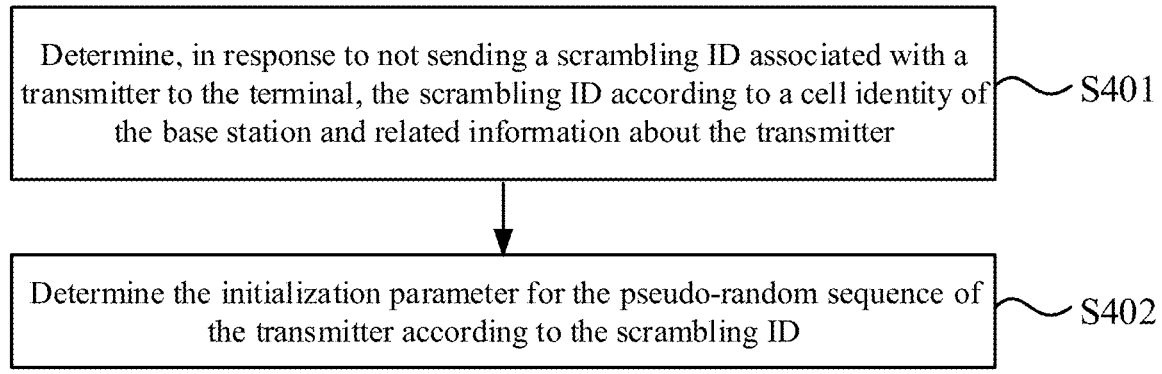
FIG. 4 is a schematic flowchart of still another PDCCH sending method according to an embodiment of the present disclosure.

The technical solutions of the present disclosure will be clearly and completely described below in conjunction with the accompanying drawings. Apparently, the described implementations are part of the implementations of the present disclosure, rather than all of the implementations. Based on the implementations in the present disclosure, all other implementations obtained by those of ordinary skill in the art without creative endeavor shall fall within the protection scope of the present disclosure.

FIG. 1 is a schematic flowchart of a Physical Downlink Control Channel (PDCCH) sending method according to an embodiment of the present disclosure. The PDCCH sending method shown in the present embodiment can be applied to a base station, and the base station may include, but is not limited to, a base station in communication systems such as 5G and 6G. The base station can communicate with a terminal serving as a user equipment, and the terminal may include, but is not limited to, a mobile phone, a tablet computer, a wearable device, a sensor, an Internet of Things device and other electronic devices. In an embodiment, the terminal may be a terminal to which PDCCH receiving methods described in any one of subsequent embodiments can be applied.

In an embodiment, at least two transmitters can be provided in the base station, and a transmitter may be an antenna panel, or a Transmission Reception Point (TRP). The base station can choose to send a PDCCH through multiple transmitters, or choose one from the transmitters to send the PDCCH individually, which can be set according to needs of the base station.

As shown in FIG. 1, the PDCCH sending method may include the following steps.

At step S101, PDCCHs are sent to a terminal through a plurality of transmitters, where Demodulation Reference Signal (DMRS) sequences for the PDCCHs sent by the plurality of transmitters are different.

In an embodiment, the base station can send the PDCCHs to the terminal through a plurality of transmitters, that is, each transmitter can send a PDCCH to the terminal.

The plurality of transmitters can send the PDCCHs to the terminal on the same time-frequency resource, or can send the PDCCHs to the terminal on different time-frequency resources, which can be selected by the base station according to needs.

A communication link can be formed between each of the transmitters and the terminal, so that a plurality of communication links can be formed between the plurality of transmitters and the terminal, and the base station can send the PDCCHs to the terminal through the plurality of communication links.

Accordingly, even if a communication link between one of the plurality of transmitters and the terminal is affected due to reasons such as blocking, deep fading, etc., it can be ensured that PDCCH(s) is sent to the terminal successfully as there is communication link(s) for sending the PDCCH between other transmitter(s) among the plurality of transmitters and the terminal. As such, the reliability of PDCCH transmitting can be improved, especially in a high frequency band, and the robustness of PDCCH can be increased to meet needs of URLLC (Ultra-reliable and Low Latency Communication) services.

In addition, since the transmitters send the PDCCH through different wireless channels, after receiving the PDCCH, the terminal can estimate the wireless channels separately based on corresponding DMRS sequence configurations and further demodulate the PDCCH.

It should be noted that the transmitters may have different positions in space, or the transmitters may be in the same position. In a case that different transmitters are in the same position in space, the transmitters can send signals in different directions, for example, directions of sending beams are different.

FIG. 2 is a schematic flowchart of another PDCCH sending method according to an embodiment of the present disclosure. As shown in FIG. 2, the method may further include the following.

At step S201, for each of the transmitters, an initialization parameter is determined.

At step S202, a DMRS sequence for the PDCCH sent by the transmitter is determined according to the initialization parameter and a pseudo-random sequence.

In an embodiment, the DMRS sequence can be determined with a pseudo-random sequence. A function for generating the pseudo-random sequence is to be initialized, where the function may include, but is not limited to, a GOLD sequence generation function. By performing initialization on the function, a parameter (i.e., the initialization parameter) can be obtained. Furthermore, the DMRS sequence can be determined according to the initialization parameter and the pseudo-random sequence. Specifically, the function for generating the pseudo-random sequence can be determined according to the initialization parameter, and a DMRS sequence can be determined according to the function and a serial number of the DMRS sequence to be determined.

According to the present embodiment, for each transmitter, an initialization parameter can be determined individually, so that the obtained initialization parameters can vary from transmitter to transmitter, and different pseudo-random sequences can be obtained according to the initialization parameters. Finally, different DMRS sequences can be obtained based on the pseudo-random sequences, so as to realize determining DMRS sequences for PDCCHs sent by the transmitters, and ensure that the DMRS sequences for PDCCHs sent by the transmitters are different.

FIG. 3 is a schematic flowchart of still another PDCCH sending method according to an embodiment of the present disclosure. As shown in FIG. 3, determining the initialization parameter for each of the plurality of transmitters may include the following.

At step S301, different scrambling identities (IDs) are determined for the plurality of transmitters.

At step S302, for each transmitter, the initialization parameter for the pseudo-random sequence of the transmitter is determined according to a corresponding scrambling ID.

At step S303, the scrambling IDs are configured to the terminal.

In an embodiment, the initialization parameter can be obtained based on a scrambling ID. The base station can configure a scrambling ID for determining the initialization parameter to the terminal, for example, the scrambling ID can be configured to the terminal through Radio Resource Control (RRC) signaling. As such, the terminal can determine the initialization parameters based on the received scrambling IDs, so as to determine DMRS sequences corresponding to the pseudo-random sequences, and demodulate the PDCCHs according to the DMRS sequences.

In an embodiment, the initialization parameter can be determined with reference to the following formula:

$$c_{init}=(2^{17}(N_{symb}^{slot}n_{s,f}^{u}+l+1)(2N_{IDk}+1)+2N_{IDk}) \bmod 2^{31};$$

where l represents a position index of a symbol in time domain; $c_{init}$ indicates an initialization parameter of GOLD sequence generation function; and $N_{symb}^{slot}$ indicates the number of symbols per slot, which may be, for example, 14. $N_{IDk}$ indicates a scrambling ID, where k indicates related information of a transmitter. That is, scrambling IDs $N_{IDk}$ can be set to be diverse from transmitter to transmitter, so that different initialization parameters can be obtained, and different DMRS sequences can be further obtained. A value range of each $N_{IDk}$ can be 0 to 65535. $n_{s,f}^{u}$ indicates a slot number within a radio frame.

In an embodiment, the DMRS sequence can be determined with reference to the following formula:

$$r_l(m)=1/\sqrt{2}(1-2\cdot c(2m))+j1/\sqrt{2}(1-2\cdot c(2m+1));$$

where l represents a position index of a symbol in time domain; c( ) indicates GOLD sequence generation function, and c(2m) and c(2m+1) can be regarded as different GOLD sequences; and m indicates a serial number of a DMRS sequence. Based on this pseudo-random sequence, a DMRS sequence for the symbol l can be generated.

FIG. 4 is a schematic flowchart of still another PDCCH sending method according to an embodiment of the present disclosure. As shown in FIG. 4, determining the initialization parameter for each of the plurality of transmitters may include the following.

At step S401, for each of the plurality of transmitters, in response to not directly sending a scrambling ID associated with the transmitter to the terminal, the scrambling ID is determined according to a cell identity of the base station and related information about the transmitter.

At step S402, the initialization parameter for the pseudo-random sequence of the transmitter is determined according to the scrambling ID.

In an embodiment, in a case that the base station does not send directly a scrambling ID corresponding to a transmitter to the terminal, the terminal cannot determine a DMRS sequence according to the scrambling ID configured by the base station. In this case, the base station and the terminal can agree in advance that the scrambling ID is determined based on information that can be obtained. For example, the scrambling ID can be determined according to the cell identity of the base station and the related information of the transmitter.

For the base station, the base station can determine the cell identity of itself and the related information of its own transmitters. For the terminal, when the terminal receives information sent by the base station (including but is not limited to the PDCCH), the terminal can determine the cell identity of the base station. In addition, when the base station is sending a PDCCH, related information of the transmitters can be carried. When the PDCCH is received, the terminal can determine the related information of the transmitters, thereby determining a scrambling ID according to the cell identity of the base station and the related information of the transmitters, and further determining a DMRS sequence according to the scrambling ID.

In an embodiment, the initialization parameter can be determined with reference to the following formula:

$$c_{init}=(2^{17}(N_{symb}^{slot}n_{s,f}^{u}+l+1)(2N_{ID}+1)+2N_{ID}) \bmod 2^{31};$$

where l represents a position index of a symbol in time domain; $N_{symb}^{slot}$ indicates the number of symbols per slot, which may be, for example, 14; and $n_{s,f}^{u}$ indicates a slot number within a radio frame. $N_{ID}$ indicates a scrambling ID, where $N_{ID}=N_{ID}^{cell}+k$, $N_{ID}^{cell}$ indicates a cell identity of the base station, and k indicates related information of a transmitter. As such, for transmitters, since related information of the transmitters are different, scrambling IDs $N_{ID}$ can be different. That is, different scrambling IDs $N_{ID}$ can be set for the transmitters, so as to obtain diverse initialization parameters and further obtain various DMRS sequences. For each $N_{ID}$, a value range thereof can be from 0 to 65535.

Figure 5:
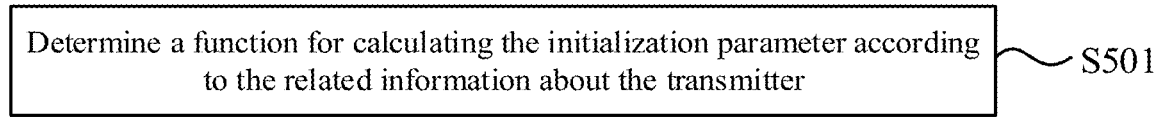
FIG. 5 is a schematic flowchart of still another PDCCH sending method according to an embodiment of the present disclosure.

FIG. 5 is a schematic flowchart of still another PDCCH sending method according to an embodiment of the present disclosure. As shown in FIG. 5, determining the initialization parameter for each of the plurality of transmitters may include the following.

At step S501, for each of the plurality of transmitters, a function for calculating the initialization parameter is determined according to the related information of the transmitter. For example, according to the related information of the transmitter, the number of symbols per slot, a position index of symbol, a slot number within a radio frame and the scrambling ID, the function used to calculate the initialization parameter is determined.

In an embodiment, the initialization parameter is to be determined based on a function. For example, in the above-mentioned embodiments, the function is as follows.

$$c_{init} = (2^{17}(N_{symb}^{slot}n_{s,f}^u + l + 1)(2N_{IDk} + 1) + 2N_{IDk}) \bmod 2^{31},$$

or $$c_{init} = (2^{17}(N_{symb}^{slot}n_{s,f}^u + l + 1)(2N_{ID} + 1) + 2N_{ID}) \bmod 2^{31}$$

For parameters in the calculation formula of the function, meanings of the parameters are the same as that of parameters in the embodiments of FIG. 3 and FIG. 4, which will not be repeated here.

In these two examples, the function for calculating the initialization parameter has not changed.

In the present embodiment, the function for calculating the initialization parameter can be adjusted. Specifically, according to the related information of the transmitter, the number of symbols per slot, a position index of the symbol, the slot number within a radio frame and the scrambling ID, the function used to calculate the initialization parameter can be determined. For example, the related information k of the transmitter can be added in the above function in an additive way (other ways can be used as well, for example, by multiplying with the scrambling ID), and the function for calculating the initialization parameter can be as follows.

$$c_{init} = (2^{17}(N_{symb}^{slot}n_{s,f}^u + l + 1)(2N_{ID} + 1) + 2N_{ID} + k) \bmod 2^{31}$$

where $N_{ID}$ can be determined in the same way of determining a scrambling ID in relevant technologies. For example, a value range of $N_{ID}$ can be from 0 to 65535, or $N_{ID} = N_{ID}^{cell}$. For other parameters in the calculation formula of the function, meanings of the parameters are the same as that of parameters in the embodiments of FIG. 3 and FIG. 4, which will not be repeated here.

As such, for transmitters, related information k of the transmitters can be different, so functions used to calculate the initialization parameters can vary from transmitter to transmitter, and the calculated initialization parameters can be diverse. That is, for the transmitters, various initialization parameters can be obtained, thereby obtaining different DMRS sequences.

It should be noted that in all embodiments, related information of a transmitter may include, but is not limited to, an identity of the transmitter, a serial number of the transmitter, a random number generated for the transmitter and the like.

Figure 6:
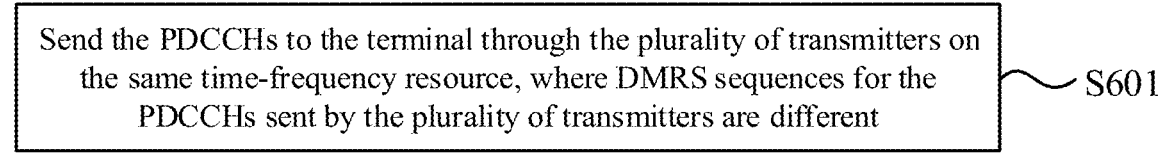
FIG. 6 is a schematic flowchart of still another PDCCH sending method according to an embodiment of the present disclosure.

FIG. 6 is a schematic flowchart of still another PDCCH sending method according to an embodiment of the present disclosure. As shown in FIG. 6, sending the PDCCHs to the terminal through the plurality of transmitters may include the following.

At step S601, the PDCCHs are sent to the terminal through the plurality of transmitters on the same time-frequency resource.

In an embodiment, the plurality of transmitters can send the PDCCHs to the terminal by using the same time-frequency resource, that is, the plurality of transmitters can perform Space Division Multiplexing (SDM). Accordingly, the terminal can receive, on the same time-frequency resource, the PDCCHs sent by the base station through a plurality of receivers. Although the plurality of PDCCHs are received with the same time-frequency resource, DMRS sequences for the PDCCHs are diverse. Therefore, it can be ensured that the terminal can demodulate, based on the diverse DMRS sequences, PDCCHs corresponding to the DMRS sequences separately.

Figure 7:
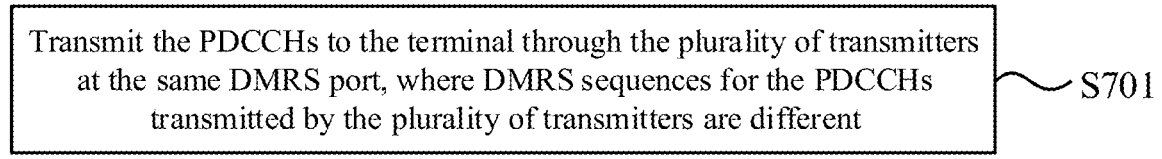
FIG. 7 is a schematic flowchart of still another PDCCH sending method according to an embodiment of the present disclosure.

FIG. 7 is a schematic flowchart of still another PDCCH sending method according to an embodiment of the present disclosure. As shown in FIG. 7, sending the PDCCHs to the terminal through the plurality of transmitters may include the following.

At step S701, the PDCCHs are sent to the terminal through the plurality of transmitters at the same DMRS port.

In an embodiment, the plurality of transmitters can send the PDCCHs to the terminal at the same DMRS port (for example, port 2000), so as to ensure that requirements of only supporting single-port PDCCH transmission in the current protocol are satisfied. While DMRS sequences for the PDCCHs sent by the plurality of transmitters are different, which may be taken as sending at a plurality of non-orthogonal (also called as quasi-orthogonal) DMRS ports.

Although the sent DMRS sequences are different, it can be guaranteed that mapping positions of the DMRS sequences in time and frequency domain are the same. For example, as shown in FIG. 8, a plurality of DMRS sequences are mapped to the same position in the time and frequency domain, where all DMRS sequences map to a Resource Element (RE) once every three data REs. In a PDCCH, contents in a data RE can include DCI. That is, the base station transmits DMRS and data in each PDCCH at the same time-frequency positions (e.g., REs).

For example, the mapping of DMRSs on time-frequency resources can be performed with reference to the following formula:

$$a_{k,l}^{(p,u)} = \beta_{DMRS}^{PDCCH} \cdot r_l(3n + k');$$

$$k = nN_{sc}^{RB} + 4k' + 1;$$

k'=0, 1, 2;
n=0, 1, . . .
$a_{k,l}^{(p,u)}$ indicates a RE position on time-frequency resources for a DMRS sequence, $\beta_{DMRS}^{PDCCH}$ indicates an amplitude scaling factor, $r_l$ indicates the DMRS sequence. In the present formula, k indicates a serial number of a subcarrier, which is different from the meaning of k in the above-mentioned formulas. $N_{sc}^{RB}$ indicates the number of subcarriers per Resource Block (RB), which is, for example, 12.

Optionally, Downlink Control Information (DCI) in the PDCCHs sent by the plurality of transmitters to the terminal is identical.

In an embodiment, the DCI in the PDCCHs transmitted by the plurality of transmitters to the terminal can be the same. In this way, even though a communication link between one of the plurality of transmitters and the terminal is affected due to reasons such as blocking, deep fading, etc., communication link(s) between other transmitter(s) among the plurality of transmitters and the terminal still exists for PDCCH transmission. Therefore, the effectiveness of PDCCH sending link can be improved and higher reception reliability can be guaranteed, which allows the terminal to obtain the DCI from the PDCCH.

Optionally, partial information of whole DCI is carried in a PDCCH sent by each of the plurality of transmitters to the terminal, and partial information of the DCI carried in the PDCCHs sent by the plurality of transmitters to the terminal constitutes complete DCI.

In an embodiment, for each transmitter, a PDCCH sent by the transmitter to the terminal can carry one piece of partial information of DCI. With pieces of partial information of DCI carried in PDCCHs sent by the plurality of transmitters to the terminal, whole DCI can be constituted.

For example, for 3 transmitters, complete DCI can be coded and divided into 3 parts, where the first part is carried by a PDCCH sent by a first transmitter, the second part is carried by a PDCCH sent by a second transmitter, and the third part is carried by a PDCCH sent by a third transmitter. As such, the flexibility of sending DCI can be improved, and even in a case of DCI with a relatively large amount of data, the DCI can be divided into a plurality of parts with a smaller amount of data and sent separately.

FIG. 9 is a schematic flowchart of a PDCCH receiving method according to an embodiment of the present disclosure. The PDCCH receiving method shown in the present embodiment can be applied to a terminal, and the terminal may include, but is not limited to, an electronic device such as a mobile phone, a tablet computer, a wearable device, a sensor, and an Internet of Things device. The terminal can serve as a user equipment to communicate with a base station, and the base station may include, but is not limited to, a base station in a communication system such as 5G and 6G. In an embodiment, the base station may be a base station to which the PDCCH sending methods described in any one of the above embodiments can be applied.

In an embodiment, at least two receivers, for example, a plurality of receiving antennas, can be arranged in the terminal. Each receiving antenna can receive a PDCCH sent by the base station.

As shown in FIG. 9, the physical downlink control channel receiving method may include the following steps.

At step S901, PDCCHs sent by a plurality of transmitters in the base station are received through a plurality of receivers, where DeModulation Reference Signal (DMRS) sequences for the PDCCHs sent by the plurality of transmitters are different.

In an embodiment, the base station can send the PDCCHs to the terminal through a plurality of transmitters, that is, each transmitter can send a PDCCH to the terminal. Accordingly, the terminal can receive, via a plurality of receivers, the PDCCHs sent by the plurality of transmitters in the base station, and DMRS sequences for the PDCCHs received by the plurality of receivers are different.

The plurality of transmitters can send the PDCCHs to the terminal on the same time-frequency resource, or can send the PDCCHs to the terminal on different time-frequency resources, which can be decided by the base station according to needs.

For each of the plurality of transmitters, a communication link can be formed between the transmitter and a receiver, so that a plurality of communication links can be formed between the plurality of transmitters and a plurality of receivers, and the base station can send the PDCCHs to the terminal through the plurality of communication links.

Accordingly, even if a communication link between one of the plurality of transmitters and the terminal is affected due to reasons such as blocking, deep fading, etc., it can be ensured that PDCCH(s) is sent to the terminal successfully as there is communication link(s) for sending the PDCCH between other transmitter(s) among the plurality of transmitters and the terminal, which is conducive to improving the reliability of PDCCH transmission.

In addition, as the transmitters send the PDCCH through different wireless channels, after receiving the PDCCH, the terminal can estimate the wireless channels separately based on corresponding DMRS sequence configurations and further demodulate the PDCCH.

FIG. 10 is a schematic flowchart of another PDCCH receiving method according to an embodiment of the present disclosure. As shown in FIG. 10, the method may further include the following.

At step S1001, for each of the plurality of transmitters, an initialization parameter corresponding to a PDCCH sent by the transmitter is determined.

At step S1002, a DMRS sequence for the PDCCH sent by the transmitter is determined according to the initialization parameter and a pseudo-random sequence.

In an embodiment, since the base station determines an initialization parameter for each of the transmitters separately, the obtained initialization parameters may vary from transmitter to transmitter. In this way, for a plurality of received PDCCHs, the terminal can determine an initialization parameter corresponding to each of the PDCCHs sent by the transmitters, and the determined initialization parameters are diverse from transmitter to transmitter. As such, DMRS sequences for the PDCCHs sent by the transmitters can be determined based on the different initialization parameters and a pseudo-random sequence. Specifically, the function for generating the pseudo-random sequence can be determined according to the initialization parameter, and a DMRS sequence can be determined according to the function and a serial number of the DMRS sequence to be generated. As such, various DMRS sequences can be obtained based on the initialization parameters to demodulate each of the PDCCHs.

Figure 11:
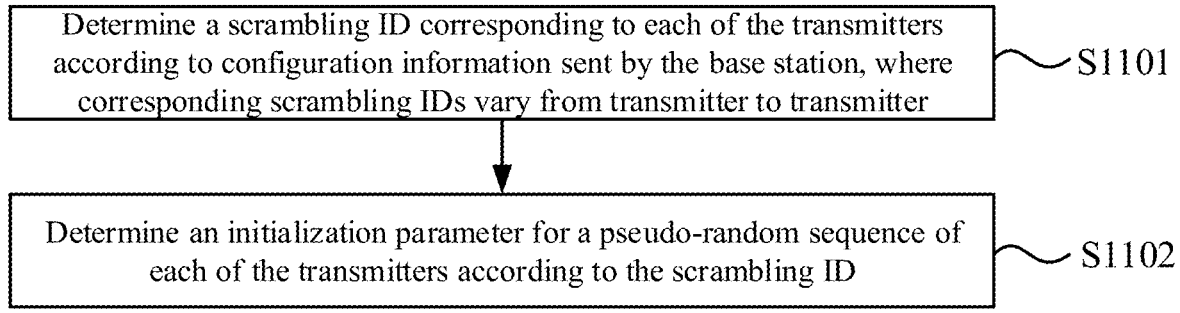
FIG. 11 is a schematic flowchart of still another PDCCH receiving method according to an embodiment of the present disclosure.

FIG. 11 is a schematic flowchart of still another PDCCH receiving method according to an embodiment of the present disclosure. As shown in FIG. 11, determining the initialization parameter corresponding to the PDCCH sent by each of the plurality of transmitters may include the following.

At step S1101, for each of the plurality of transmitters, a scrambling identity (ID) corresponding to the transmitter is determined according to configuration information sent by the base station, where corresponding scrambling IDs vary from transmitter to transmitter.

At step S1102, the initialization parameter for the pseudo-random sequence of the transmitter is determined according to the scrambling ID.

In an embodiment, the initialization parameter can be obtained based on a scrambling ID. The base station can configure a scrambling ID for determining the initialization parameter to the terminal, for example, the scrambling ID can be configured to the terminal through Radio Resource Control (RRC) signaling. As such, the terminal can determine the initialization parameters based on the received scrambling ID, so as to determine DMRS sequences corresponding to the pseudo-random sequences, and demodulate the PDCCHs according to the DMRS sequences.

In an embodiment, the initialization parameter can be determined with reference to the following formula:

$$c_{init} = \left(2^{17}\left(N_{symb}^{slot}n_{s,f}^{u} + l + 1\right)(2N_{IDk} + 1) + 2N_{IDk}\right) \bmod 2^{31}$$

where l represents a position index of a symbol in time domain; $C_{init}$ indicates an initialization parameter of GOLD sequence generation function; and $N_{symb}^{slot}$ indicates the number of symbols per slot, which may be, for example, 14. $N_{IDk}$ indicates a scrambling ID, where k indicates related information of a transmitter. That is, various scrambling IDs $N_{IDk}$ can be set for transmitters, so that different initialization parameters can be obtained, and different DMRS sequences can be further obtained. A value range of each $N_{IDk}$ can be 0 to 65535. $n_{s,f}^{u}$ indicates a slot number within a radio frame.

The base station can configure $N_{IDk}$ to the terminal, so that the terminal can determine, when a PDCCH sent by a transmitter with related information k is received, an initialization parameter corresponding to the transmitter according to scrambling ID $N_{IDk}$, and further determine a DMRS sequence for the PDCCH sent by the transmitter.

In an embodiment, the DMRS sequence can be determined with reference to the following formula:

$$r_l(m) = \frac{1}{\sqrt{2}}(1 - 2 \cdot c(2m)) + j\frac{1}{\sqrt{2}}(1 - 2 \cdot c(2m+1))$$

where l represents a position index of a symbol in time domain; c( ) indicates GOLD sequence generation function, and c(2m) and c(2m+1) can be taken as different GOLD sequences; and m indicates a serial number of a DMRS sequence. Based on this pseudo-random sequence, a DMRS sequence for the symbol/can be generated.

Figure 12:
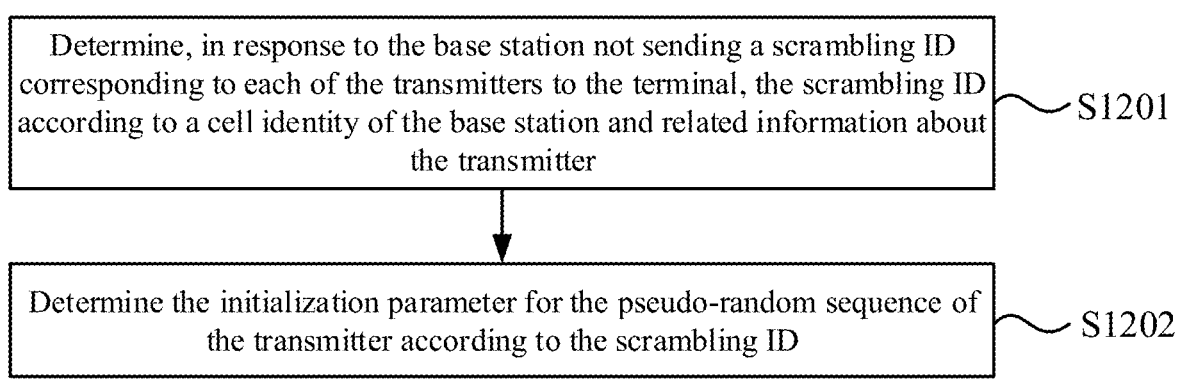
FIG. 12 is a schematic flowchart of still another PDCCH receiving method according to an embodiment of the present disclosure.

FIG. 12 is a schematic flowchart of still another PDCCH receiving method according to an embodiment of the present disclosure. As shown in FIG. 12, determining, for each of the plurality of transmitters, the initialization parameter corresponding to the PDCCH sent by the transmitter may include the following.

At step S1201, for each of the plurality of transmitters, in response to the base station not sending a scrambling ID corresponding to the transmitter to the terminal, the scrambling ID is determined according to a cell identity of the base station and related information about the transmitter.

At step S1202, the initialization parameter for the pseudo-random sequence of the transmitter is determined according to the scrambling ID.

In an embodiment, in a case that the base station does not send directly a scrambling ID corresponding to a transmitter to the terminal, the terminal cannot determine a DMRS sequence according to the scrambling ID configured by the base station. In this case, the base station and the terminal can agree in advance that the scrambling ID is determined based on information that can be obtained. For example, the scrambling ID can be determined according to the cell identity of the base station and the related information of the transmitter.

For the terminal, when information sent by the base station (including but not limited to the PDCCH) is received, the terminal can determine the cell identity of the base station. In addition, when the base station is sending a PDCCH through a transmitter, related information of the transmitters can be carried. When the PDCCH is received, the terminal can determine the related information of the transmitter that sends the PDCCH, thereby determining the scrambling ID according to the cell identity of the base station and the related information of the transmitter, and further determining a DMRS sequence according to the scrambling ID.

In an embodiment, the initialization parameter can be determined with reference to the following formula:

$$c_{init} = \left(2^{17}\left(N_{symb}^{slot}n_{s,f}^{u} + l + 1\right)(2N_{ID} + 1) + 2N_{ID}\right)\mathrm{mod}2^{31};$$

where l represents a position index of a symbol in time domain; $N_{symb}^{slot}$ indicates the number of symbols per slot, which may be, for example, 14; and $n_{s,f}^{u}$ indicates a slot number within a radio frame. $N_{ID}$ indicates a scrambling ID, where $N_{ID}=N_{ID}^{cell}+k$, $N_{ID}^{cell}$ indicates a cell identity of the base station, and k indicates related information of a transmitter. As such, for transmitters, scrambling IDs $N_{ID}$ can be different. That is, different scrambling IDs $N_{ID}$ can be set for the transmitters, so that various initialization parameters can be obtained, thereby obtaining different DMRS sequences. For each $N_{ID}$, a value range thereof can be from 0 to 65535.

Accordingly, when a PDCCH sent by a transmitter with related information k is received, the terminal can determine a scrambling ID $N_{ID}$ according to the cell identity of the base station and k, thereby determining the initialization parameter corresponding to the transmitter according to the scrambling ID $N_{ID}$, and further determining the DMRS sequence for the PDCCH sent by the transmitter.

Figure 13:
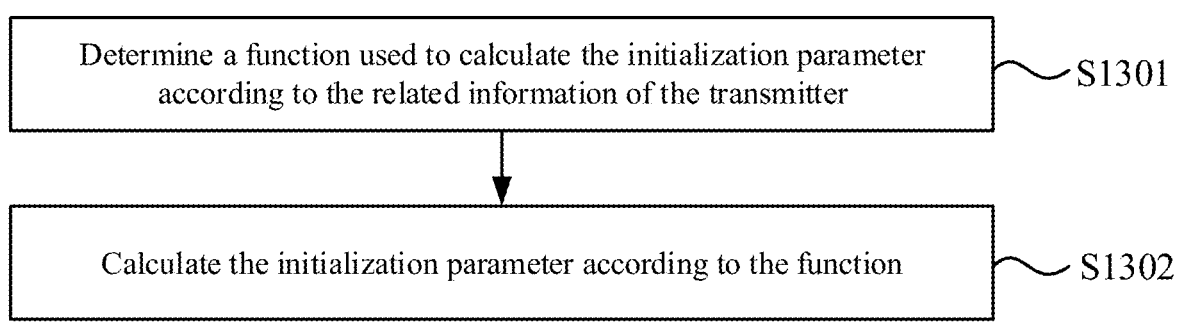
FIG. 13 is a schematic flowchart of still another PDCCH receiving method according to an embodiment of the present disclosure.

FIG. 13 is a schematic flowchart of still another PDCCH receiving method according to an embodiment of the present disclosure. As shown in FIG. 13, determining, for each of the plurality of transmitters, the initialization parameter corresponding to the PDCCH sent by the transmitter may include the following.

At step S1301, a function used to calculate the initialization parameter is determined according to related information about the transmitter. For example, according to related information about the transmitter, the number of symbols per slot, a position index of a symbols, a slot number within a radio frame and the scrambling ID, the function for calculating the initialization parameter can be determined.

At step S1302, the initialization parameter is calculated according to the function.

In an embodiment, the base station can adjust the function for calculating the initialization parameter. Specifically, according to the related information of the transmitter, the number of symbols per slot, a position index of the symbol, the slot number within a radio frame and the scrambling ID, the function used to calculate the initialization parameter can be determined. For example, the related information k of the transmitter can be added in the above function in an additive way (other ways can be used as well, for example, by multiplying with the scrambling ID), and the function for calculating the initialization parameter can be as follows.

$$c_{init} = \left(2^{17}\left(N_{symb}^{slot}n_{s,f}^{u} + l + 1\right)(2N_{ID} + 1) + 2N_{ID} + k\right)\mathrm{mod}2^{31}$$

where $N_{ID}$ can be determined in the same way of determining a scrambling ID in relevant technologies. For example, a value range of $N_{ID}$ can be from 0 to 65535, or $N_{ID}=N_{ID}^{cell}$. For other parameters in the calculation formula of the function, meanings of the parameters are the same as that of parameters in the embodiments of FIG. 11 and FIG. 12, which will not be repeated here.

As such, for transmitters, related information k of the transmitters can be different, so functions used to calculate the initialization parameters can vary from transmitter to transmitter, and the calculated initialization parameters can be diverse. That is, for the transmitters, various initialization parameters can be obtained, thereby obtaining different DMRS sequences.

For the terminal, when a PDCCH sent by a transmitter is received, related information about the transmitter can be further obtained. A function used to calculate an initialization parameter can be determined according to the related information about the transmitter, such that the initialization parameter corresponding to the transmitter can be calculated with the function, and a DMRS sequence for the PDCCH sent by the transmitter can be further determined.

FIG. 14 is a schematic flowchart of still another PDCCH receiving method according to an embodiment of the present disclosure. As shown in FIG. 14, receiving the PDCCHs sent by the plurality of transmitters in the base station through the plurality of receivers can include the following.

At step S1401, the PDCCHs sent by the plurality of transmitters in the base station are received by the plurality of receivers at the same time-frequency resource.

In an embodiment, the plurality of transmitters can send the PDCCHs to the terminal by using the same time-frequency resource, that is, the plurality of transmitters can perform SDM. Accordingly, the terminal can receive, on the same time-frequency resource, the PDCCHs sent by the base station through a plurality of receivers. Although the plurality of PDCCHs are received with the same time-frequency resource, DMRS sequences for the PDCCHs are diverse. Therefore, it can be ensured that the terminal can demodulate, based on the diverse DMRS sequences, PDCCHs corresponding to the DMRS sequences separately.

Optionally, the PDCCHs received by the plurality of receivers in the terminal correspond to the same DMRS port.

In an embodiment, the plurality of transmitters in the base station can send the PDCCHs to the terminal at the same DMRS port (for example, port 2000). Correspondingly, the PDCCHs received by the plurality of receivers in the terminal correspond to the same DMRS port.

As such, it can be ensured that requirements of only supporting single-port PDCCH transmission in the current protocol are satisfied. While DMRS sequences for the PDCCHs sent by the plurality of transmitters are different, which may be taken as sending at a plurality of non-orthogonal (also called as quasi-orthogonal) DMRS ports. Although the sent DMRS sequences are different, it can be guaranteed that mapping positions of the DMRS sequences in time and frequency domain are the same.

FIG. 15 is a schematic flowchart of still another PDCCH receiving method according to an embodiment of the present disclosure. As shown in FIG. 15, the method may further include the following.

At step S1501, DCI is obtained from at least one of the PDCCHs, where the DCI in each of the PDCCHs is identical.

In an embodiment, the DCI in the PDCCHs sent by the plurality of transmitters in the base station to the terminal can be the same, so the terminal can obtain identical DCI from each of the PDCCHs when the PDCCHs are received. Therefore, even if a communication link between one of the plurality of transmitters and the terminal is affected due to reasons such as blocking, deep fading, etc., communication link(s) between other transmitter(s) among the plurality of transmitters and the terminal still exists for PDCCH transmission. Therefore, the effectiveness of PDCCH sending link can be improved and higher reception reliability can be guaranteed, which allows the terminal to obtain the DCI from the PDCCH.

FIG. 16 is a schematic flowchart of still another PDCCH receiving method according to an embodiment of the present disclosure. As shown in FIG. 16, the method may further include the following.

At step S1601, partial information of DCI is obtained from each of the PDCCHs.

At step S1602, complete DCI is determined according to partial information of the DCI obtained from the PDCCHs.

In an embodiment, for each of the plurality of transmitters, a PDCCH sent by the transmitter to the terminal can carry one piece of partial information of DCI. With pieces of partial information of DCI carried in PDCCHs sent by the plurality of transmitters to the terminal, whole DCI can be constituted. When the PDCCHs are received, the terminal can acquire one piece of partial information of the DCI from each of the PDCCHs, and constitute complete DCI with pieces of partial information of DCI acquired from the PDCCHs.

For example, for 3 transmitters, complete DCI can be coded and divided into 3 parts, where the first part is carried by a PDCCH sent by a first transmitter, the second part is carried by a PDCCH sent by a second transmitter, and the third part is carried by a PDCCH sent by a third transmitter. As such, the flexibility of sending DCI can be improved, and even in a case of DCI having a relatively large amount of data, the DCI can be divided into a plurality of parts with a smaller amount of data and sent separately.

When the PDCCHs sent by the above three transmitters are received, the terminal can obtain three pieces of partial information of DCI from the PDCCHs sent by these three transmitters, and combine the three pieces of partial information of DCI into complete DCI.

Optionally, the transmitter may include at least one of:
a transmission reception point or an antenna panel.

Corresponding to the above-mentioned embodiments of the PDCCH sending methods and the PDCCH receiving methods, the present disclosure further provides embodiments of PDCCH sending apparatuses and PDCCH receiving apparatuses.

Figure 17:
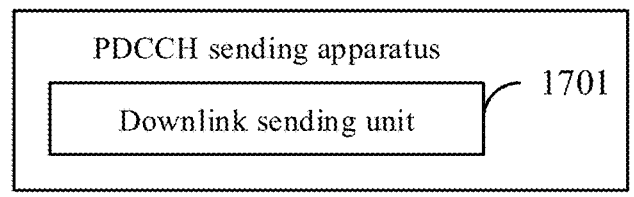
FIG. 17 is a schematic block diagram of a PDCCH sending apparatus according to an embodiment of the present disclosure.

FIG. 17 is a schematic block diagram of a PDCCH sending apparatus according to an embodiment of the present disclosure. The physical downlink control channel sending apparatus shown in the present embodiment can be applied to a base station, and the base station may include, but is not limited to, a base station in communication systems such as 5G and 6G. The base station can communicate with a terminal serving as a user equipment, and the terminal may include, but is not limited to, a mobile phone, a tablet computer, a wearable device, a sensor, an Internet of Things device and other electronic devices. In an embodiment, the terminal may be a terminal to which a physical downlink control channel receiving apparatus described in any one of subsequent embodiments is applied.

In an embodiment, a plurality of transmitters can be set in the base station, and a transmitter may include an antenna panel, or a Transmission Reception Point (TRP). The base station can choose to send a PDCCH through multiple transmitters, or choose one from the transmitters to send the PDCCH alone, which can be set according to needs of the base station.

As shown in FIG. 17, the physical downlink control channel sending apparatus may include the following.

A downlink sending unit 1701, configured to send PDCCHs to a terminal through a plurality of transmitters, where Demodulation Reference Signal (DMRS) sequences for the PDCCHs sent by the plurality of transmitters are different.

Figure 18:
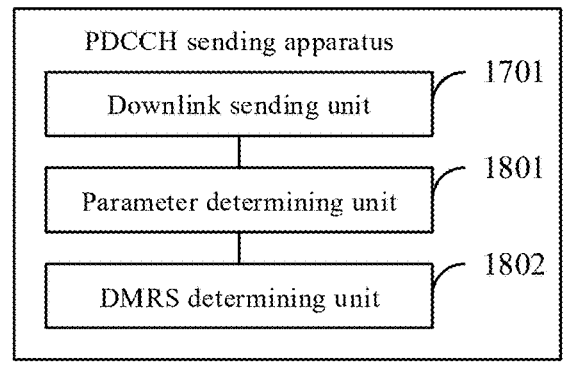
FIG. 18 is a schematic block diagram of another PDCCH sending apparatus according to an embodiment of the present disclosure.

FIG. 18 is a schematic block diagram of another PDCCH sending apparatus according to an embodiment of the present disclosure. As shown in FIG. 18, the apparatus further includes:

a parameter determining unit 1801, configured to determine an initialization parameter for each of the plurality of transmitters; and a DMRS determining unit 1802, configured to determine, according to the initialization parameter and a pseudo-random sequence, a DMRS sequence for a PDCCH sent by the transmitter.

Optionally, the parameter determining unit is configured to determine different scrambling identities (IDs) for the plurality of transmitters; determine, for each of the plurality of transmitters, the initialization parameter for the pseudo-random sequence of the transmitter according to a corresponding scrambling ID; and configure the scrambling IDs to the terminal.

Optionally, the parameter determining unit is configured to determine, in response to not sending a scrambling ID associated with the transmitter to the terminal, the scrambling ID according to a cell identity of the base station and related information about the transmitter; and determine the initialization parameter for the pseudo-random sequence of the transmitter according to the scrambling ID.

Optionally, the parameter determining unit is configured to determine a function for calculating the initialization parameter according to related information of the transmitter.

Optionally, the downlink sending unit is configured to send the PDCCHs to the terminal through the plurality of transmitters on a same time-frequency resource.

Optionally, the downlink sending unit is configured to send the PDCCHs to the terminal through the plurality of transmitters at a same DMRS port.

Optionally, downlink control information (DCI) in the PDCCHs sent by each of the plurality of transmitters to the terminal is identical.

Optionally, partial information of Downlink Control Information (DCI) is carried in the PDCCH sent by each of the plurality of transmitters to the terminal, and partial information of the DCI carried in the PDCCHs sent by the plurality of transmitters to the terminal constitutes complete DCI.

Optionally, the transmitter includes at least one of the following:

a transmission reception point or an antenna panel.

Figure 19:
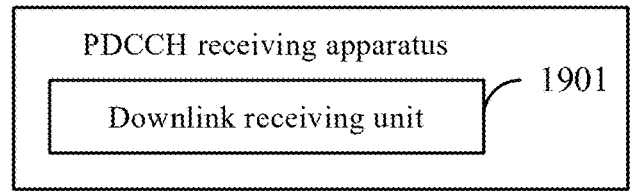
FIG. 19 is a schematic block diagram of a PDCCH receiving apparatus according to an embodiment of the present disclosure.

FIG. 19 is a schematic block diagram of a PDCCH receiving apparatus according to an embodiment of the present disclosure. The PDCCH receiving apparatus shown in the present embodiment can be applied to a terminal, and the terminal may include, but is not limited to, an electronic device such as a mobile phone, a tablet computer, a wearable device, a sensor, and an Internet of Things device. The terminal can serve as a user equipment to communicate with a base station, and the base station may include, but is not limited to, a base station in a communication system such as 5G and 6G. In an embodiment, the base station may be a base station to which the PDCCH sending apparatuses described in any one of the above embodiments can be applied.

In an embodiment, at least two receivers, for example, a plurality of receiving antennas, may be set in the terminal. Each receiving antenna can receive a PDCCH sent by the base station.

As shown in FIG. 19, the PDCCH receiving apparatus may include:

a downlink receiving unit 1901, configured to receive PDCCHs sent by a plurality of transmitters in a base station through a plurality of receivers, where Demodulation Reference Signal (DMRS) sequences for the PDCCHs sent by the plurality of transmitters are different.

Figure 20:
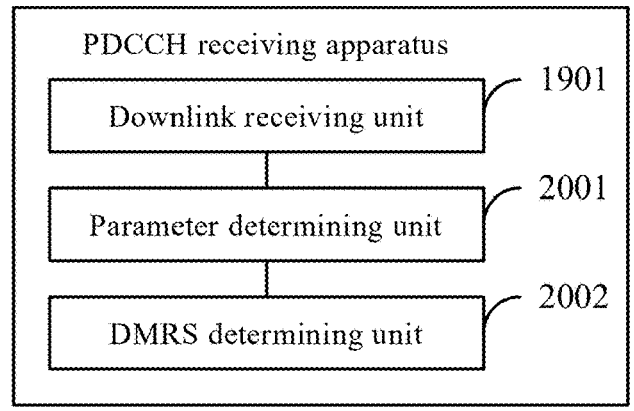
FIG. 20 is a schematic block diagram of another PDCCH receiving apparatus according to an embodiment of the present disclosure.

FIG. 20 is a schematic block diagram of another PDCCH receiving apparatus according to an embodiment of the present disclosure. As shown in FIG. 20, the apparatus further includes:

a parameter determining unit 1902, configured to determine an initialization parameter corresponding to a PDCCH sent by each of the plurality of transmitters; and a DMRS determining unit 1903, configured to determine, according to the initialization parameter and a pseudo-random sequence, a DMRS sequence for the PDCCH sent by each of the plurality of transmitters.

Optionally, the parameter determining unit is configured to determine a scrambling identity (ID) corresponding to each of the plurality of transmitters according to configuration information sent by the base station, where corresponding scrambling IDs vary from transmitter to transmitter; and determine, according to the scrambling ID, the initialization parameter for the pseudo-random sequence of each of the plurality of transmitters.

Optionally, the parameter determining unit is configured to determine, for each of the plurality of transmitters, in response to the base station not sending a scrambling identity (ID) corresponding to the transmitter to the terminal, the scrambling ID according to a cell identity of the base station and related information about the transmitter; and determine the initialization parameter for the pseudo-random sequence of the transmitter according to the scrambling ID.

Optionally, the parameter determining unit is configured to determine a function for calculating the initialization parameter according to related information about the transmitter; and calculate the initialization parameter according to the function.

Optionally, the downlink receiving unit is configured to receive, by the plurality of receivers at the same time-frequency resource, the PDCCHs sent by the plurality of transmitters in the base station.

Optionally, the PDCCHs received by the plurality of receivers in the terminal correspond to the same DMRS port.

Figure 21:
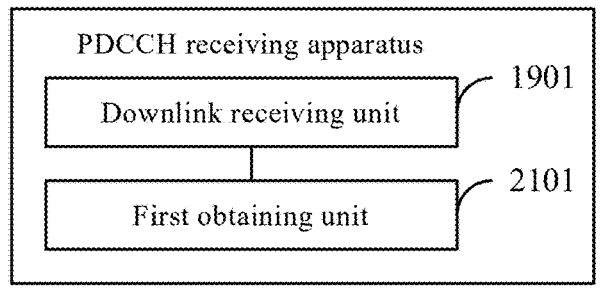
FIG. 21 is a schematic block diagram of still another PDCCH receiving apparatus according to an embodiment of the present disclosure.

FIG. 21 is a schematic block diagram of still another PDCCH receiving apparatus according to an embodiment of the present disclosure. As shown in FIG. 21, the apparatus further includes:

a first obtaining unit 2101, configured to obtain Downlink Control Information (DCI) from at least one of the PDCCHs, where the DCI in each of the PDCCHs is identical.

Figure 22:
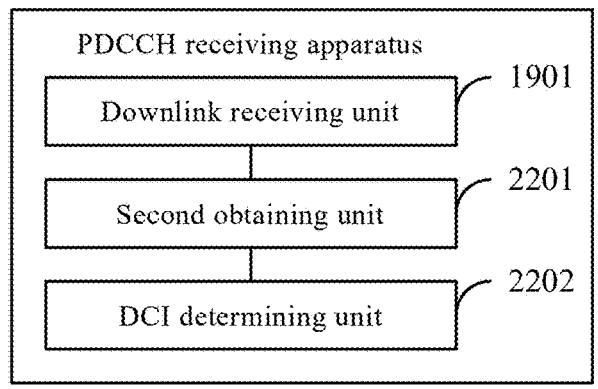
FIG. 22 is a schematic block diagram of still another PDCCH receiving apparatus according to an embodiment of the present disclosure.

FIG. 22 is a schematic block diagram of still another PDCCH receiving apparatus according to an embodiment of the present disclosure. As shown in FIG. 22, the apparatus further includes:

a second obtaining unit 2201, configured to obtain partial information of Downlink Control Information (DCI) from each of the PDCCHs; and a DCI determining unit 2202, configured to determine complete DCI according to partial information of the DCI obtained from the PDCCHs.

Optionally, the transmitter includes at least one of the following:

a transmission reception point or an antenna panel.

With regard to the apparatuses in the above embodiments, specific manners in which each unit executes operations have been described in detail in the embodiments of related methods, and will not be described in detail here.

For apparatus embodiments, since the apparatus embodiments basically correspond to method embodiments, reference may be made to some of the description of the method embodiments. The apparatus embodiments described above are merely schematic, in which units described as separate components may or may not be physically separated, and components shown as units may or may not be physical units, that is, the components may be located in one place or be distributed to a plurality of network modules. Part or all of the units can be selected according to actual requirements to implement the objectives of the solutions in the embodiments. Those of ordinary skill in the art can understand and implement without creative work.

Embodiments of the present disclosure further provide an electronic device, including:
a processor,
a memory storing instructions executable by the processor;
where the processor is configured to perform the PDCCH sending methods described in any one of the above embodiments.

The embodiments of the present disclosure further provide an electronic device, including:
a processor,
a memory storing instructions executable by the processor;
where the processor is configured to perform the PDCCH receiving methods described in any one of the above embodiments.

The embodiments of the present disclosure further provide a computer-readable storage medium, on which a computer program is stored, and when the program is executed by a processor, steps in the PDCCH sending methods described in any one of the above embodiments are implemented.

The embodiments of the present disclosure further provide a computer-readable storage medium, on which a computer program is stored, and when the program is executed by a processor, steps in the PDCCH receiving methods described in any one of the above embodiments are implemented.

Figure 23:
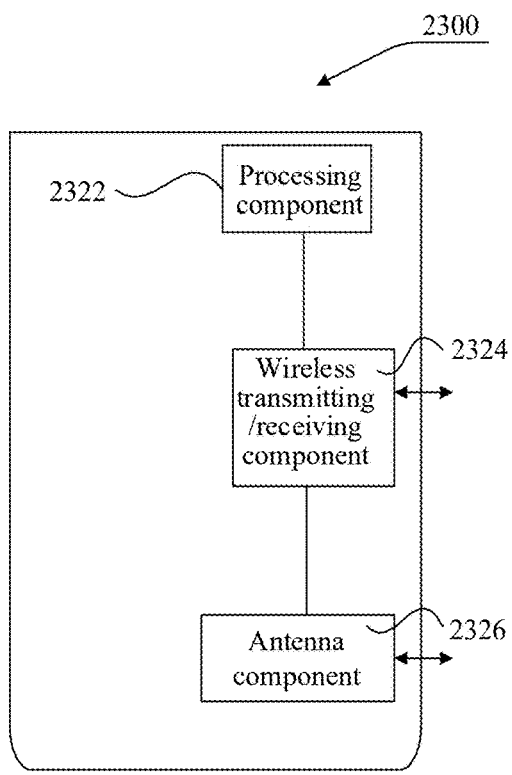
FIG. 23 is a schematic block diagram of a device for PDCCH sending according to an embodiment of the present disclosure.

As shown in FIG. 23, which is a schematic block diagram showing a PDCCH receiving device 2300 in accordance with examples of the present disclosure. The device 2300 may be provided as a base station. Referring to FIG. 23, the device 2300 may include a processing component 2322, a wireless transmitting/receiving component 2324, an antenna component 2326 and a signal processing portion specific to a wireless interface. The processing component 2322 may further include one or more processors. One processor in the processing component 2322 may be configured to perform the PDCCH sending methods described in the any one of embodiments above.

Figure 24:
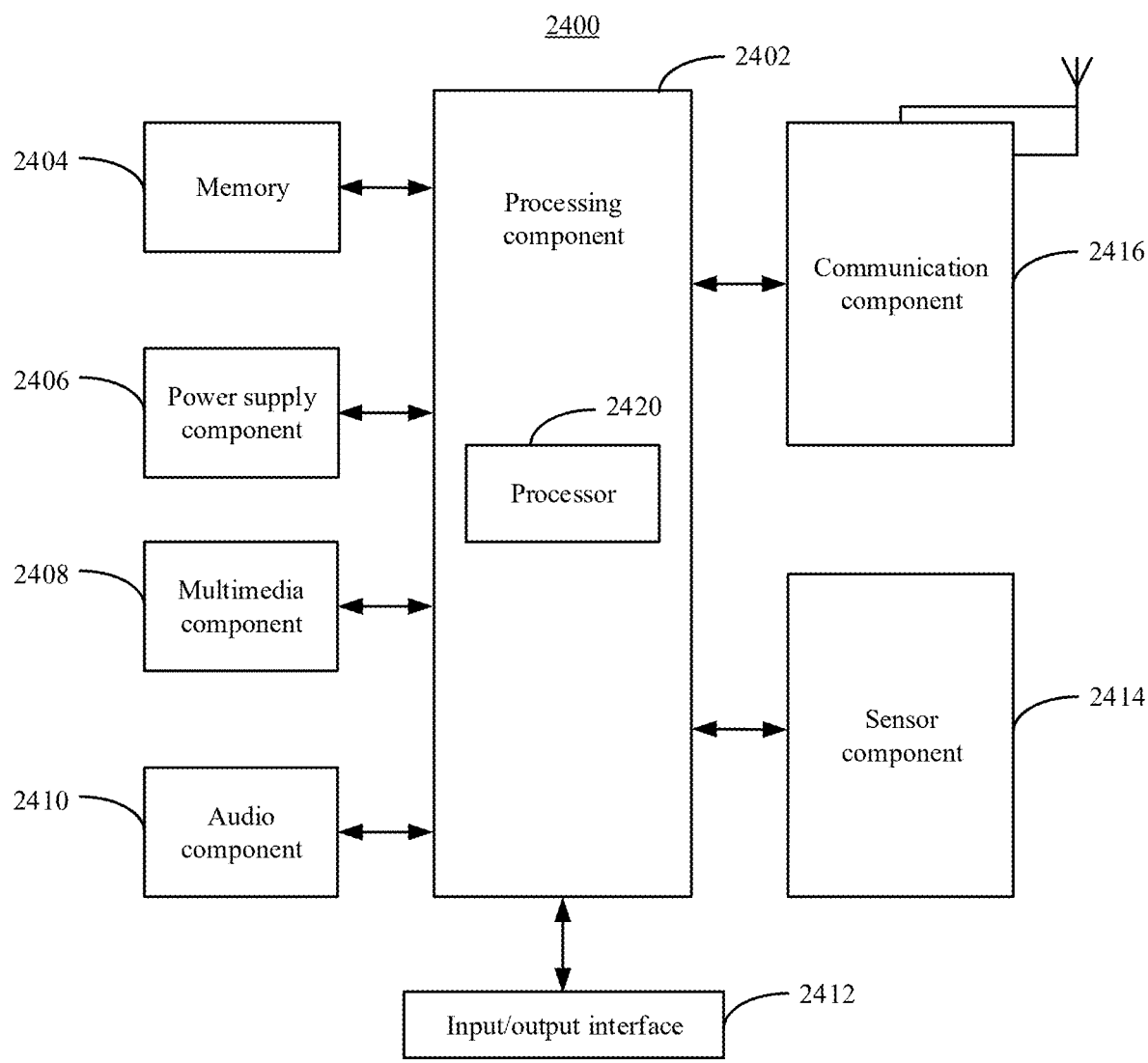
FIG. 24 is a schematic block diagram of a device for PDCCH receiving according to an embodiment of the present disclosure.

FIG. 24 is a schematic block diagram illustrating a PDCCH receiving device 2400 according to the embodiments of the present disclosure. For example, the device 2400 may be a mobile phone, a computer, a digital broadcasting terminal, a message sending-receiving equipment, a game console, a tablet equipment, a medical equipment, a fitness equipment, a personal digital assistant and the like.

Referring to FIG. 24, the device 2400 may include one or more of the following components: a processing component 2402, a memory 2404, a power supply component 2406, a multimedia component 2408, an audio component 2410, an input/output (I/O) interface 2412, a sensor component 2414 and a communication component 2416.

The processing component 2402 generally controls overall operations of the device 2400, such as operations associated with display, phone calls, data communications, camera operations, and recording operations. The processing component 2402 may include one or more processors 2420 to execute instructions to complete all or part of the steps of the above PDCCH receiving methods. In addition, the processing component 2402 may include one or more modules which facilitate the interaction between the processing component 2402 and other components. For example, the processing component 2402 may include a multimedia module to facilitate the interaction between the multimedia component 2408 and the processing component 2402.

The memory 2404 is configured to store various types of data to support the operation of the device 2400. Examples of such data include instructions for any application or method operated on the device 2400, contact data, phonebook data, messages, pictures, videos, and so on. The memory 2404 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2406 supplies power for different components of the device 2400. The power supply component 2406 may include a power supply management system, one or more power supplies, and other components associated with generating, managing and distributing power for the device 2400.

The multimedia component 2408 includes a screen that provides an output interface between the device 2400 and a user. In some embodiments, the screen may include a liquid crystal display (LCD) and a touch panel (TP). In a case that the screen includes a touch panel, the screen can be implemented as a touch screen to receive input signals from the user. The touch panel may include one or more touch sensors to sense touch, sliding, and gestures on the touch panel. The touch sensors can not only sense a boundary of a touch or sliding operation, but also detect a duration and pressure related to the touch or sliding operation. In some embodiments, the multimedia component 2408 includes a front camera and/or a rear camera. When the device 2400 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2410 is configured to output and/or input audio signals. For example, the audio component 2410 includes a microphone (MIC) configured to receive an external audio signal when the device 2400 is in an operation mode, such as a call mode, a recording mode, and a voice recognition mode. The received audio signal may be further stored in the memory 2404 or transmitted via the communication component 2416. In some embodiments, the audio component 2410 also includes a loudspeaker for outputting an audio signal.

The I/O interface 2412 provides an interface between the processing component 2402 and a peripheral interface module which may be a keyboard, a click wheel, a button, or the like. These buttons may include, but are not limited to a home button, a volume button, a start button, and a lock button.

The sensor component 2414 includes one or more sensors for providing a status assessment in various aspects to the device 2400. For example, the sensor component 2414 may detect an open/closed state of the device 2400, and the relative positioning of components, for example, the components are a display and a keypad of the device 2400. The sensor component 2414 may also detect a change in position of the device 2400 or a component of the device 2400, the presence or absence of a user in contact with the device 2400, the orientation or acceleration/deceleration of the device 2400 and a change in temperature of the device 2400. The sensor component 2414 may include a proximity sensor configured to detect the presence of nearby objects without any physical contact. The sensor component 2414 may also include a light sensor, such as a CMOS or CCD image sensor, for use in imaging applications. In some embodiments, the sensor component 2414 may also include an acceleration sensor, a gyro sensor, a magnetic sensor, a pressure sensor, or a temperature sensor.

The communication component 2416 is configured to facilitate wired or wireless communication between the device 2400 and other devices. The device 2400 may access a wireless network based on a communication standard, such as WiFi, 2G, 3G, 4G LTE or 5G NR, or a combination thereof. In an embodiment, the communication component 2416 receives broadcast signals or broadcast associated information from an external broadcast management system via a broadcast channel. In an embodiment, the communication component 2416 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the device 2400 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above PDCCH receiving methods.

In an embodiment, there is also provided a non-transitory computer readable storage medium including instructions, such as the memory 2404, where the instructions are executable by the processor 2420 of the device 2400 to perform the PDCCH receiving methods as described above. For example, the non-transitory computer readable storage medium may be ROM, RAM, CD-ROM, magnetic tape, floppy disk, and optical data storage device and the like.

According to the embodiments of the present disclosure, even if a communication link between one of the plurality of transmitters and the terminal is affected due to reasons such as blocking, deep fading, etc., it can be ensured that PDCCH(s) is sent to the terminal successfully as there is communication link(s) for sending the PDCCH between other transmitter(s) among the plurality of transmitters and the terminal. As such, the reliability of PDCCH sending can be improved, especially in a high frequency band, and the robustness of PDCCH can be increased to meet needs of URLLC (Ultra-reliable and Low Latency Communication) services.

In addition, since the transmitters send the PDCCH through different wireless channels, after receiving the PDCCH, the terminal can estimate the wireless channels separately based on corresponding Demodulation Reference Signal (DMRS) sequence configurations and further demodulate the PDCCH.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as examples only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited by the appended claims.

It is noted that in the present disclosure, relationship terms such as first and second are used merely to distinguish one entity or operation from another, without necessarily requiring or implying any such actual relationship or order between those entities or operations. The term "includes", "comprises" or any other variation thereof, is intended to cover non-exclusive inclusion so that a process, method, article, or apparatus that includes a set of elements includes not only those elements, but also other elements not explicitly listed, or also includes elements that are inherent to such process, method, article, or apparatus. Without further limitation, the elements defined by the statement "including a . . . " do not preclude the existence of additional identical elements in the process, method, article, or apparatus that include the elements.

The methods and apparatuses provided by the embodiments of the present disclosure have been described in detail above. In the present disclosure, specific examples are used to explain principles and implementations of the present disclosure. The above examples are used to help understand the methods and core ideas of the present disclosure. Meanwhile, for those skilled in the art, according to the idea of the present disclosure, there would be changes in the specific implementations and application scopes. In summary, the contents of this specification should not be construed as a limitation to the present disclosure.

What is claimed is:

1. A Physical Downlink Control Channel (PDCCH) sending method, comprising:
   sending, by a base station comprising at least two transmitters, PDCCHs to a terminal through a plurality of transmitters, wherein Demodulation Reference Signal (DMRS) sequences for the PDCCHs sent by the plurality of transmitters are different;
   wherein the method further comprises:
   determining different scrambling identities (IDs) for the plurality of transmitters;
   determining, for a transmitter of the plurality of transmitters, an initialization parameter for a pseudo-random sequence of the transmitter according to a scrambling ID corresponding to the transmitter;

determining, according to the initialization parameter and the pseudo-random sequence, a DMRS sequence for a PDCCH sent by the transmitter; and configuring the scrambling IDs to the terminal.

2. The method according to claim 1, wherein sending the PDCCHs to the terminal through the plurality of transmitters comprises at least one of:

sending the PDCCHs to the terminal through the plurality of transmitters on a same time-frequency resource;

or sending the PDCCHs to the terminal through the plurality of transmitters at a same DMRS port.

3. The method according to claim 1, wherein downlink control information (DCI) in the PDCCHs sent by the plurality of transmitters to the terminal is identical.

4. The method according to claim 1, wherein partial information of Downlink Control Information (DCI) is carried in the PDCCH sent by each of the plurality of transmitters to the terminal, and partial information of the DCI carried in the PDCCHs sent by the plurality of transmitters to the terminal constitutes complete DCI.

5. The method according to claim 1, wherein a transmitter among the plurality of transmitters comprises at least one of:

a transmission reception point or an antenna panel.

6. A physical downlink control channel (PDCCH) receiving method, comprising:

receiving, by a terminal comprising at least two receivers, PDCCHs sent by a plurality of transmitters in a base station through a plurality of receivers, wherein Demodulation Reference Signal (DMRS) sequences for the PDCCHs sent by the plurality of transmitters are different;

wherein the method further comprises:

determining a scrambling identity (ID) corresponding to each of the plurality of transmitters according to configuration information sent by the base station, wherein corresponding scrambling IDs vary from transmitter to transmitter;

determining, according to the scrambling ID, an initialization parameter for a pseudo-random sequence of each of the plurality of transmitters; and determining, according to the initialization parameter and the pseudo-random sequence, a DMRS sequence for a PDCCH sent by each of the plurality of transmitters.

7. The method according to claim 6, wherein receiving the PDCCHs sent by the plurality of transmitters in the base station through the plurality of receivers comprises:

receiving, by the plurality of receivers at a same time-frequency resource, the PDCCHs sent by the plurality of transmitters in the base station.

8. The method according to claim 6, wherein the PDCCHs received by the plurality of receivers in the terminal correspond to a same DMRS port;

or a transmitter among the plurality of transmitters comprises at least one of: a transmission reception point or an antenna panel.

9. The method according to claim 6, further comprising:

obtaining Downlink Control Information (DCI) from at least one of the PDCCHs, wherein the DCI in the PDCCHs is identical.

10. The method according to claim 6, further comprising:

obtaining partial information of Downlink Control Information (DCI) from each of the PDCCHs; and determining complete DCI according to partial information of the DCI obtained from the PDCCHs.

11. An electronic device, comprising:

at least one processor, a memory storing instructions executable by the at least one processor;

wherein when executing the instructions, the at least one processor is caused to:

send Physical Downlink Control Channels (PDCCHs) to a terminal through a plurality of transmitters, wherein Demodulation Reference Signal (DMRS) sequences for the PDCCHs sent by the plurality of transmitters are different;

wherein when executing the instructions, the at least one processor is further caused to:

determine different scrambling identities (IDs) for the plurality of transmitters;

determine, for a transmitter of the plurality of transmitters, an initialization parameter for a pseudo-random sequence of the transmitter according to a scrambling ID corresponding to the transmitter;

determine, according to the initialization parameter and the pseudo-random sequence, a DMRS sequence for a PDCCH sent by the transmitter; and configure the scrambling IDs to the terminal.

\* \* \* \* \*